United States Patent [19]
Ardary et al.

[11] 3,793,204
[45] Feb. 19, 1974

[54] THERMAL INSULATION

[75] Inventors: Zane L. Ardary, Kingston, Tenn.;
David H. Sturgis, Muskegon, Mich.;
Carl D. Reynolds, Oak Ridge, Tenn.

[73] Assignee: The United States of America as represented by the United States Atomic Energy Commission, Washington, D.C.

[22] Filed: July 28, 1972

[21] Appl. No.: 276,209

[52] U.S. Cl.................. 252/62, 161/158, 161/168, 264/29
[51] Int. Cl...................... C04b 43/02, B29c 25/00
[58] Field of Search 252/62; 161/158, 168; 219/461; 106/40 R; 423/448; 264/29

[56] References Cited
UNITED STATES PATENTS

| 3,055,831 | 9/1962 | Barnett et al. | 252/62 |
| 3,124,853 | 3/1964 | Glaser et al. | 252/62 X |
| 3,151,364 | 10/1964 | Glaser et al. | 252/62 X |
| 3,510,429 | 5/1970 | Iserson et al. | 252/62 |
| 3,560,155 | 2/1971 | Olstowski et al. | 423/448 |
| 3,577,344 | 5/1971 | Ardary et al. | 252/62 |
| 3,718,497 | 2/1973 | Rice | 252/62 X |

Primary Examiner—Charles E. Van Horn
Attorney, Agent, or Firm—Roland A. Anderson; John A. Horan; Earl L. Larcher

[57] ABSTRACT

The thermal insulating properties of fibrous thermal insulation are improved for high temperature applications by incorporating graphite flakes in the insulation to substantially reduce radiant heat transfer in fibrous insulation which comprises randomly oriented fibers joined primarily at their nexus by a binder of carbonized starch and graphite flakes oriented in the insulation with the greatest surface area of the flakes being disposed normal to the direction of radiant heat transfer.

6 Claims, 1 Drawing Figure

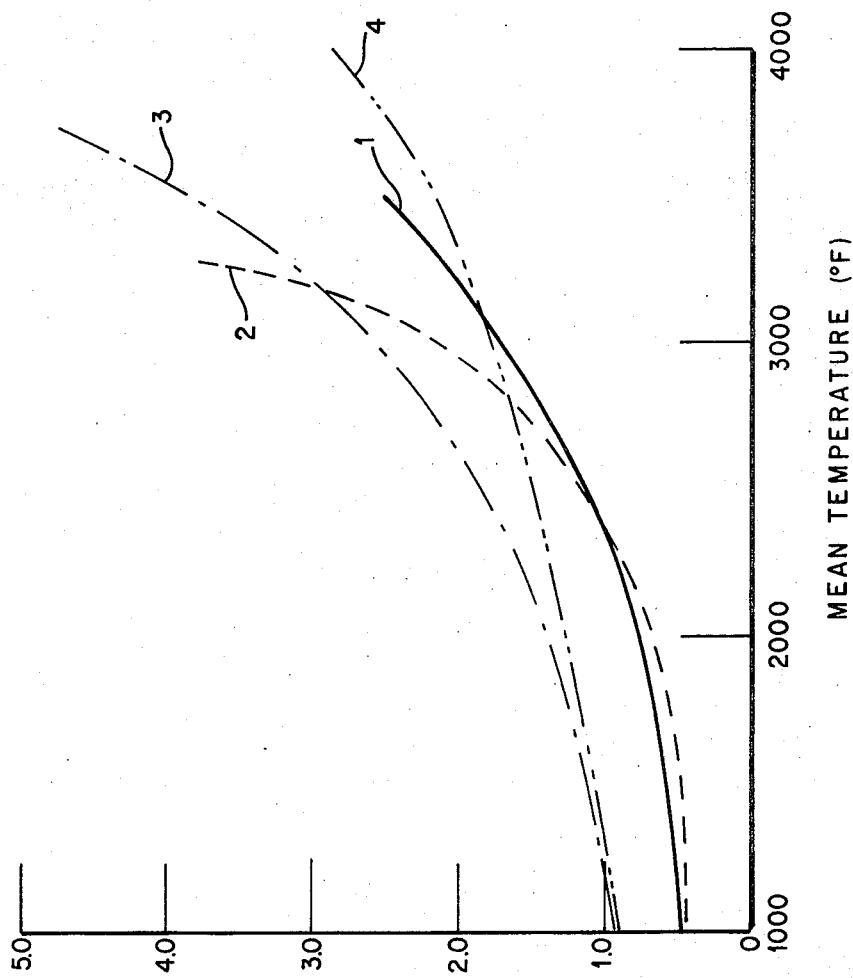

THERMAL INSULATION

The present invention relates generally to fibrous thermal insulation and more particularly to such insulation wherein graphite flakes are incorporated for increasing the opacity of the insulation to radiant heat transfer. This invention was made in the course of, or under, a contract with the U.S. Atomic Energy Commission.

Thermal insulation is required for the protection of heat-sensitive systems and personnel when exposed to high temperature environments such as encountered in aerospace operations. In such applications weight is often of significant importance so as to necessitate the use of relatively light weight insulation for providing the desired thermal protection. To this end satisfactory results have been achieved by employing fibrous composites in which inorganic or carbonaceous fibers are joined together by a carbonized binder. Such fibrous insulation, may be satisfactorily prepared by employing the process set forth in assignee's U.S. Pat. No. 3,577,344, which issued May 4, 1971, entitled "Fibrous Thermal Insulation and Method of Making Same." Generally, this patented process comprises the steps of admixing very-small-diameter fibers made from materials which have a low thermal conductivity and high heat resistance with water and starch in particulate form. The slurry resulting from the fiber-water-starch admixture is formed into the desired configuration with uniform distribution of the starch particulates throughout the molded fiber structure by a vacuum or centrifugal molding operation. The shaped molding is heated toa temperature sufficient to geltinize the starch, then dried, and subsequently subjected to a temperature sufficient to carbonize the starch and thereby bind together the fibers in a random orientation to form the thermal insulation.

While the above described fibrous thermal insulation is satisfactory for many applications it suffers a significant shortcoming or drawback when employed at elevated temperatures where infrared radiation is present. At relatively low temperatures (room temperature to about 1000°F), heat transfer through the insulation is predominantly by solid and gaseous condition. The contribution of radiant heat transfer attendant with infrared radiation to total heat transfer is small at such lower temperatures, but becomes increasingly significant with increasing temperature, since the radiation is proportional to absolute temperatue to the fourth power.

Radiant heat transfer in fibrous insulators has been reduced somewhat by the addition of materials such as titanium oxide particles which attenuate radiation through absorption and scattering. However, problems in assuring uniform distribution of the particles and adequate attenuation of radiant heat without significant weight increeas have been troublesome. Further, for a reduction in the total heat transfer to occur, the reduction in radiant heat transfer must not be outweighed by an increase in the solid conduction due to the addition of the opacifying material.

It is the primary aim or objective of the present invention to provide an improved fibrous insulation wherein the total rate of heat transfer through the insulation is lowered with the thermal conductivity being substantially reduced over that previously available in such insulation when subjected to temperatures above about 1000°F. Generally, the improved fibrous insulating composite comprises a plurality of discrete fibers of a carbonaceous or refractory material joined together in random orientation by a binder consisting essentially of carbonized starch which has been previously gelatinized, the improvement being in the incorporation of thin graphite flakes in the composite with the maximum dimension of each of said flakes being disposed essentially orthogonal to the expected direction of heat flow through said composite.

Other and further objects of the invention will be obvious upon an understanding of the illustrative product and method about to be described, or will be indicated in the appended claims, and various advantages not referred to herein will occur to one skilled in the art upon employment of the invention in practice.

A preferred method of preparing the fibrous insulation of the invention has been chosen for the purpose of illustration and description. The preferred method described is not intended to be exhaustive or to limit the invention to the precise method disclosed. It is chosen and described in order to best explain the principles of the invention and their application in practical use to thereby enable others skilled in the art to best utilize the invention in various embodiments and modifications as are best adapted to the particular use contemplated.

In the accompanying drawing:

The FIGURE is a graph illustrating the improvement in the thermal conductivity of the fibrous insulation of the present invention.

The fibrous thermal insulation of the present invention is prepared by employing the steps of mixing together fibers exhibiting low thermal conductivity and high heat resistance such as provided by refractory or carbonaceous materials with thin graphite flakes of a discoidal configuration and a mixture of water and starch particulates which provide the binder for joining together the fibers in a random orientation and securing the flakes in the resulting composite. The graphite flake-fiber-water-starch mixture or slurry is vacuum formed into the desired configuration, with the starch particulates and flakes uniformly dispersed throughout the fibers. The graphite flake-starch-water-fiber mixture is then subjected to a sufficient quantity of heat to effect a reaction between the starch and the water to gelatinize the starch. After gelatinization and prior to hydrolysis the formed mixture is dried and then heated to a temperature sufficient to convert the starch to carbon for joining together the fibers.

The formation of the fibrous insulation into composites or structures of the desired configuration while providing relatively smooth surface finishes and uniform wall thicknesses of 1.5 inches or more has been satisfactorily achieved by employing a vacuum molding process. Basically, a vacuum or pulp molding process found suitable comprises the steps of separating the fibers from intertwined clumps or agglomerates of the fibers by a conventional screening technique, mixing the fibers and graphite flakes in water containing the desired quantity of starch for a period of about 30 minutes to assure a homogeneous distribution of the solids, feeding the resulting slurry from a mixing tank into a molding assembly containing a perforated mold or mandrel which is under the influence of vacuum at a pressure in the range of about 500 to 760 mm, and drawing off excess water after all of the solids have been deposited on the mandrel. During the vacuum drawdown the graphite flakes tend to orient themselves flat against the composite mat being formed by the molding or filtering process resulting in the flat surfaces of the flakes, i.e., either flat side of the flake as opposed to the edge of the flake, being disposed in substantially parallel planes which are at least substantially normal to the source of vacuum defined by the perforated mold. With the graphite flakes so oriented in the composite the flat surfaces are disposed in parallel planes that are at least substantially orthogonal to a plane projecting through the thickness of the composite which is parallel to the path of radiant heat transfer in the composite when the latter is employed as the thermal insulation.

The gelatinizing of starch and pyrolysis of the latter in the composite may be achieved by placing the composite containing mold assembly in a heated, water-saturated atmosphere at a temperature of about 95°C. for a duration in the range of about 8 to about 20 hours to gelatinize the starch, setting the starch by continuing the drying operation at low humidity and at about the same temperature for approximately an additional 20 to 32 hours (if desired, higher temperatures, e.g., up to about 150°C., may be used for the drying step to complete drying more rapidly), and thereafter removing the rigid composite from the mandrel and pyrolyzing or carbonizing the starch at a temperature in the range of about 900–1200°C. in an inert atmosphere for about 16 to 36 hours to effect carbon-bonding of the fibers.

The starch employed as the fiber binding agent is a vegetable starch exhibiting virtual insolubility in water, but ready dispersement with slight agitation. Satisfactory results have been achieved by using starches such as tapioca, potato, and arrowroot with the starches having a particle size of about 10 microns.

Satisfactory results have been achieved using carbon fibers of about 2-micron diameter and 10- and 30-mil lengths. Insulation produced from fibers of 10- and 30-mil lengths and starch:fiber:flake ratio of 1.0:1.0:1.0 provided thermal insulation composites having densities of 17.0 and 12.0 lbs/ft³, respectively. Other fibers found to be satisfactory for use in the thermal insualtion include graphite and refractories such as silica, zirconia, thoria, aluminum silicate, kaolinite, bauxite, magnesite, dolomite, chromite, and silicon carbide.

A starch:fiber:graphite flake ratio, by weight, in a range of about 1.0:1.0:0.5 to 1.0:1.0:2.0 prior to carbonizing the starch has been found to be adequate for effective attenuation of heat transfer, particularly radiant heat transfer. The use of a starch:fiber:graphite flake ratio in this range also provides thermal insulation of low density and sufficient strength for use in most high temperature applications. However, with the greater flake content the compressive strength of the insulation decreases since the weight ratio of the binder to the weight of the fiber and flakes necessarily decreases.

Incorporation of graphite flakes in the carbon fiber insulation results in a lowering of the total rate of heat transfer, with the reduction in thermal conductivity becoming more significant with increasing temperature above about 1000°F. This can be attributed to the alignment of the flakes in a manner which presents the flat sides of the flakes (greatest surface area) orthogonal or substantially orthogonal to the direction of radiant heat transfer. Maximum radiation attenuation per flake is thereby obtained by providing a large absorption and/or scattering cross section. At the same time, the orientation of the thin flakes results in a minimal increase in the path available for solid conduction (through the thickness). A reduction in overall conductivity at elevated temperatures is, therefore, realized as the reduction in radiant transfer offsets the increase in solid conduction. The flake orientation and consequent efficient radiation attenuation also results in minimal weight addition to the composite.

The graphite flakes employed in the insulation may be prepared by embrittling sheets of thin (0.005 to 0.010 inch thickness) graphite in liquid nitrogen and then vacuum drawing the sheets through a suitable mill containing a sizing plate with 0.5 to 4.0 mm diameter holes. The resulting flakes have an average surface area of about 19 m²/g, but flakes having surface areas in the range of about 15 to 25 m²/g may be satisfactorily employed.

In the drawing, lines 1 and 3 are the thermal conductivity curves of graphite-flake-free fibrous composites having densities of 0.17 gm/cc and 0.15 gm/cc, respectively, and prepared from formulations having a starch:carbon fiber ratio of 1.0:1.0 by weight. Lines 2 and 4 are the thermal conductivity curves of graphite flake-containing fibrous composites respectively having densities of 0.20 gm/cc and 0.18 gm/cc and prepared from formulations having a starch:carbon fiber: graphite flake ratio of 1.5:1.0:0.5 and 1.0:1.0:1.0. As shown by these curves the thermal conductivity of the graphite flake-containing fibrous insulation is less than that of the fibrous insulation without the graphite flakes at temperatures greater than about 2500°F with the differences in thermal conductivity becoming more significant as the temperature increases.

The fibrous thermal insulation prepared in accordance with the teachings of the present invention possesses a density of less than about 20 lbs/ft³ and normally in the range of about 10 to 18 lbs/ft³ with the higher densities provided by the use of the larger quantities of graphite flakes and/or fibers. The compressive strength of the fibrous insulation containing the graphite flakes is less than the compressive strength provided by flake-free fibrous insulation and is in the range of about 50 to 150 psi at 10 percent deflection at room temperature and 25 to 75 psi at 10 percent deflection at a temperature of 2340°C. The modulus of elasticity at room temperature is in the range of about $0.5 \times 10^3$ to $4.0 \times 10^3$ psi and the thermal conductivity is is less than 1.5 BTU-in/hr-°F-ft² at 1000°F. However, this range of compressive strengths is adequate for most normal insulating applications since the insulation is not usually relied upon for structural purposes.

A typical preparation of the fibrous insulation of the present invention is set forth below by way of example in order to more clearly describe the method of manufacture.

EXAMPLE

A 14-inch diameter by one-inch thick disc of insulation was vacuum-molded at a pressure of 700 mm from a dilute water slurry on a perforated plate. The slurry contained 250 grams of carbon fibers prepared by pyrolyzing rayon fibers of 0.010-inch length and 3.7-micron diameter, 375 grams of tapioca starch made from cassava plants, 250 grams of graphite flakes having a surface area of about 19.2 m²/g, and 150 liters of water. The prepared fibrous mat was processed through curing, drying, and heat treatment operations to effect a semi-rigid, carbon-bonded structure. The curing and drying operations were performed at 90°C. in a high-humidity environment. The structure was heat treated at 1000°C. in an inert atmosphere to pyrolyze the starch binder. Analysis of the disc indicated a density of 17.0 pounds per cubic foot, a compressive strength at room temperature of 132 psi at 10 percent deflection and 155 psi at 20 percent deflection, a compressive strength at 2340°C. of 45 psi at 10 percent deflection and 60 psi at 20 percent deflection, a modulus of elasticity at room temperature of 4920 psi, and a coefficient of thermal conductivity in a vacuum of 3.0 BTU-in/hr-°F-ft$^2$ at 3860°F mean temperature.

The above described fibrous insulation represents a significant improvement in thermal insulation used at high temperatures due to the opacity to radiant heat transfer provided by the graphite flakes.

What is claimed is:

1. An improved thermal insulating composite comprising a plurality of discrete fibers of a carbonaceous or refractory material joined together in random orientation by a binder consisting essentially of carbonized starch which has been previously gelatinized, the improvement being in the incorporation of graphite flakes in the composite with the maximum dimension of said flakes being disposed in substantially parallel planes and essentially orthogonal to the expected direction of radiant heat transfer through said composite, said insulating composite having a density of less than about 20 lbs/ft$^3$ and a thermal conductivity of less than 1.5 BTU-in/hr-°F-ft$^2$ at 1000°F.

2. The improved thermal insulating composite claimed in claim 1, wherein the graphite flakes have a thickness in the range of about 0.005 to 0.010 inch and a surface area in the range of 15 to 25 square meters per gram, and wherein the starch:fiber:graphite flake weight ratio in the composite prior to carbonizing the starch is in the range of 1.0:1.0:0.5 to 1.0:1.0:2.0.

3. The improved thermal insulating composite claimed in claim 2, wherein the fibers consist essentially of carbon, are of a diameter of about 2 microns, and are of a length in the range of about 10 to 30 mils.

4. A method for manufacturing a thermal insulating composite consisting of randomly oriented fibers joined together by a carbonized binder and graphite flakes dispersed within the composite in substantially parallel planes, comprising the steps of mixing together graphite flakes with a plurality of fibers of a carbonaceous or refractory material, particulate vegetable starch having a particle size of about 10 microns, and water for forming a slurry of the flakes, fibers and starch, forming the slurry into a desired configuration by contacting a perforated mold with the slurry, subjecting the slurry through the perforated mold to a pressure less than atmospheric to form and maintain the slurry in a contacting relationship with the mold and to position the flakes in said substantially parallel planes, maintaining said pressure for removing excess water from the slurry, heating the formed slurry to a temperature adequate to at least gelatinize the starch, and thereafter heating the composite in an inert atmosphere to carbonize the starch.

5. The method for manufacturing a thermal insulating composite as claimed in claim 4, wherein the graphite flakes have a thickness in the range of about 0.005 to 0.010 inch and a surface area in the range of 15 to 25 square meters per gram, and wherein the starch:fiber:graphite flake weight ratio in the composite prior to carbonizing the starch is in the range of 1.0:1.0:0.5 to 1.0:1.0:2.0.

6. The method for manufacturing a thermal insulating composite as claimed in claim 4, wherein the fibers consist essentially of carbon. are of a diameter of about 2 microns, and are of a length in the range of about 10 to 30 mils.

* * * * *